United States Patent [19]

Bianchi

[11] Patent Number: 5,263,695
[45] Date of Patent: Nov. 23, 1993

[54] SUSPENSION OF VEHICLES USING TWO STIFFNESSES, ADAPTED RESPECTIVELY FOR OBTAINING A GOOD LEVEL OF COMFORT AND A GOOD LEVEL OF BEHAVIOR

[75] Inventor: Mauro Bianchi, La Garde Freinet, France

[73] Assignee: Mauro Bianchi S.A., Puteaux, France

[21] Appl. No.: 903,667

[22] Filed: Jun. 24, 1992

[30] Foreign Application Priority Data

Jun. 24, 1991 [FR] France .................. 91 07847

[51] Int. Cl.$^5$ ............................................ B60G 11/15
[52] U.S. Cl. ...................... 267/225; 267/252; 267/289
[58] Field of Search ............... 267/175, 174, 177, 170, 267/224, 225, 237, 251, 252, 289, 291, 221; 280/670, 724, 696

[56] References Cited

U.S. PATENT DOCUMENTS

| | | | |
|---|---|---|---|
| 2,902,274 | 9/1959 | McIntyre | 267/225 |
| 3,163,411 | 12/1964 | Heckethorn | 267/225 |
| 3,503,601 | 3/1970 | Wells | 267/170 X |
| 3,572,678 | 3/1971 | Jerz, Jr. | 267/289 X |
| 4,162,062 | 7/1979 | Strauss | 267/225 |
| 4,273,317 | 6/1981 | Blee | 267/64.17 |

FOREIGN PATENT DOCUMENTS

| | | |
|---|---|---|
| 1757467 | 10/1957 | Fed. Rep. of Germany . |
| 1505454 | 2/1970 | Fed. Rep. of Germany . |
| 3714363 | 11/1987 | Fed. Rep. of Germany ...... 267/289 |
| 829453 | 6/1938 | France . |
| 2647061 | 11/1990 | France . |
| 2664210 | 1/1992 | France . |
| 2652783 | 2/1992 | France . |
| 60-136635 | 7/1985 | Japan . |
| 496980 | 12/1938 | United Kingdom . |
| 1401988 | 8/1975 | United Kingdom . |
| 2164417 | 3/1986 | United Kingdom . |
| WO91/04876 | 4/1991 | World Int. Prop. O. . |

Primary Examiner—Robert J. Oberleitner
Assistant Examiner—Peter M. Poon
Attorney, Agent, or Firm—Young & Thompson

[57] ABSTRACT

A suspension for a vehicle wheel, comprising an elongated shock absorber (7) having an elongated body (6) and first and second abutments at opposite ends of the shock absorber. First and second coil compression springs (R20, R30) are aligned with each other and surround the shock absorber (7). One of these springs bears against one of the abutments and the other of the springs bears against the other of the abutments. A cup (32) is disposed between the springs, this cup surrounding the body and being movable lengthwise of the body. Both of the springs bear on the cup (32). An annular jack (5) is fixed to and surrounds the body and comprises one (10) of the abutments. A third abutment (31) is fixed to the body a distance from the jack (5). An elastic ring (54) is compressible between the cup (32) and the third abutment (31). A movable jacket (4) surrounds and is slidable in sealed relationship on the body (6) and on the annular jack (5) and defines with the body (6) and jack (5) a hydraulic chamber of variable size. Provision (8, 9) is made to deliver hydraulic fluid to the hydraulic chamber to vary the size of the hydraulic chamber. A third coil compression spring (11) surrounds the body (6) and acts between the third abutment (31) and the jacket (4).

3 Claims, 9 Drawing Sheets

SUSPENSION OF VEHICLES USING TWO STIFFNESSES, ADAPTED RESPECTIVELY FOR OBTAINING A GOOD LEVEL OF COMFORT AND A GOOD LEVEL OF BEHAVIOR

FIELD OF THE INVENTION

The invention relates to a vehicle suspension using two stiffnesses, adapted respectively to obtain a good level of comfort (low stiffness) and a good level of behavior (high stiffness).

The high stiffness is used during expansion and during the end of compression.

The low stiffness is used during compression in an adjustable limited region when the vehicle is moving; this regulation can be manual or automatic.

THE PRIOR ART

The state of the art can be defined by the following patents:

FR-A-89.06533 of May 16, 1989, filed by S. A. MAURO BIANCHI: "Process for double flexibility suspension, particular for automotive vehicles of the type i which the chassis of the automotive vehicle is sandwiched between two opposed suspensions, one conventional, a so-called "negative" flexibility suspension, the other a so-called "positive" flexibility suspension, the "positive" flexibility suspension is mounted in opposition to the "negative" flexibility, characterized by the fact that said suspension is provided with adjustment means, said "negative and positive" elastic elements are adjusted as needed for use, with zero prestress, or with a certain mode; the choice of the prestress of the "negative and positive" flexibility elastic elements thus becomes a regulating element of this suspension."

FR-A-89.13240 of Oct. 5, 1989, filed by S. A. MAURO BIANCHI: "Process for vehicle wheel suspension using one or several elastic elements mounted in opposition to each other in the case in which there are several elastic elements, in the case of a single elastic element at least one abutment limits the operation to a single portion of said element, characterized by the fact that is imposes on the suspension of each of the vehicle wheels a variation in stiffness or flexibility having two levels on the curve (shock-expansion and compressive force), that said use of the different stiffnesses or flexibilities is dynamically effected and that the point of inflection of said curve is located during unloading of the suspension in the vicinity of the position of the vehicle riding on its wheels and that the lowest stiffness is located in the second portion of the course of collapsing of the wheel suspension. The displacement of the point of inflecting of the curve (shock-expansion and compressive force) is effected by adjustment of the operation of the suspension such that said point of inflection will be above or below the loaded position of the vehicle."

FR-A-90.08859 of Jul. 6, 1990, filed by S. A. MAURO BIANCHI: "Process for suspension of the type using a greater stiffness over the path located between the "loaded and operating" position and the "suspended wheels" position than the path located between the "loaded and operating" position and the "collapsed suspension" position up to the shock abutments; graphically illustrated, the change of stiffness is marked by a break in the curve, characterized by the fact that it uses means to smooth the break in the curve. The suspension process uses an adjustment means to adjust the point of break of the curve during each of the changes of load of the vehicle."

Figure 1:
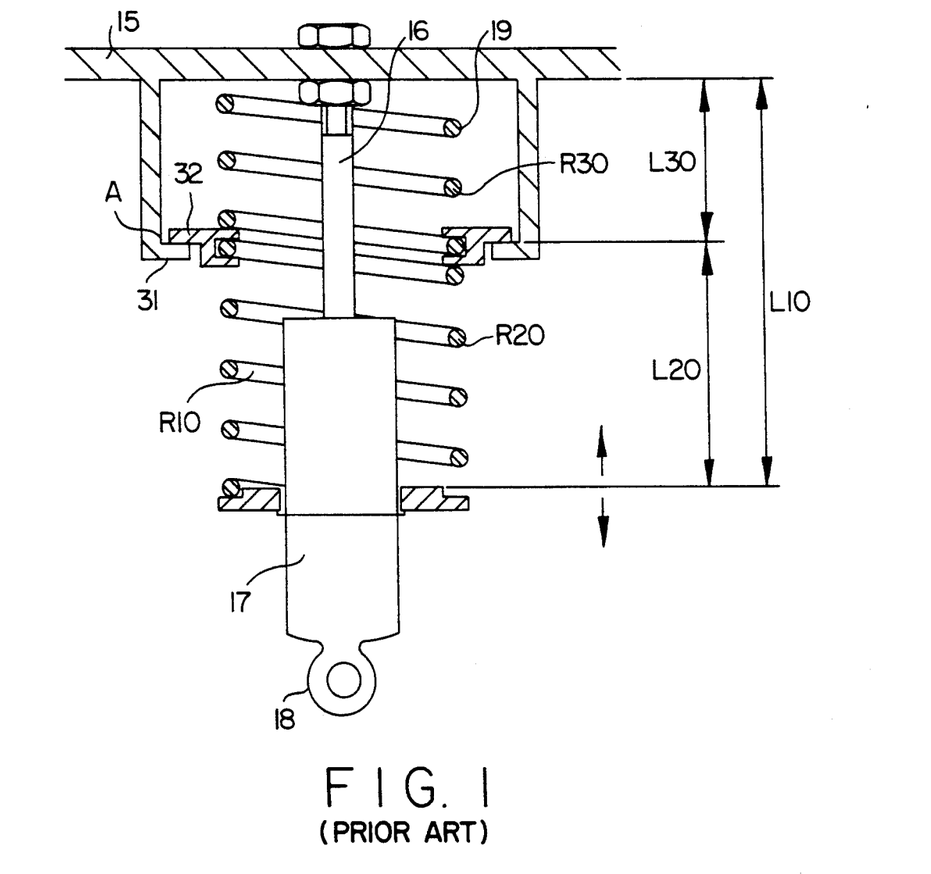
FIG. 1 is a schematic view of the state of the art as defined above and which shows the suspension process in the case of a single elastic element or spring and in which there is used a single abutment which limits the operation to a single portion of said element.

One of the principles of the suspension as described, particularly in patent application Ser. No. 89.13240 of Oct. 5, 1989, makes use of a single helical spring loaded at the level of a turn of its central portion (see FIG. 1). A portion R30 of the spring R10 is thus enclosed and under stress between two abutments, both fixed to the chassis 15 of the vehicle. The portion R20 of the same spring R10 is located between the cup 32 secured to one of the central turns of the spring and another cup secured to the movable portion of the suspension, in this event the shock absorber 17. When the vehicle is operating on its wheels, the spring receives a pressure corresponding to the portion of the suspended weight accounted for by the suspension in question. This pressure is adjacent that which is developed by the enclosed portion R30 of the spring on its two abutments. It will thus be understood that, relative to this medial position of the suspension which corresponds to the operating condition of the vehicle:

a) if the suspension is compressed in the course of a shock to the wheel, the pressure on the spring assembly increases and becomes greater than that which is applied by the portion R30 of the spring to its abutments. The cup 32 then disengages from its abutment 31 and the spring operates then over all of its length and flexibility.

The action of the suspension is located in the region of least stiffness of the suspension.

b) if the suspension is expanded, the pressure on the spring assembly decreases and becomes less than that applied by the portion R30 of the spring to its abutments. The cup 32 bearing on its seat thus prevents this portion R30 of the spring from expanding. Only the portion R20 of the spring expands. The flexibility of the spring is thus only partially exploited.

The action of the suspension is located in the region of greatest stiffness of the suspension.

FR-A-829.453: the invention has for its object improvements in the elastic systems of variable flexibility, particularly for vehicle suspensions, which improvements consist principally in so arranging the systems of the type in question that during at least a portion of their total path, a part of the elastic means, particularly the springs which comprise them, will be automatically prevented from expanding, which leads to a modification of the flexibility.

SUMMARY OF THE INVENTION

The suspension of a vehicle wheel according to the present invention is of the type using one or several elastic elements. In the case of a single elastic element, it uses at least one abutment which limits the operation to a certain portion of said element, so as to impose on the suspension of each of the wheels of the vehicle a variation of stiffness or flexibility with two slopes on the curve (shock-expansion and compressive force); the point of inflection of said curve is located during unloading of the suspension in the neighborhood of the position of the loaded vehicle on its wheels; the least stiffness is located in the second portion of the path of collapse of the wheel suspension. The displacement of the point of inflection on the curve (shock-expansion and compressive force) is effected by adjustment of the operation of the suspension, such that said point of inflection will be above or below the loaded position of the vehicle. In the case of the use of a single spring, an abutment cup is fixed to the level of the central turns of the spring, which permits distinguishing the upper portion of the spring above the cup and the lower portion of this same spring below the cup; the lower portion of the spring is enclosed in compression between two abutments, both being fixed to the chassis of the vehicle; the lower portion of the same spring is positioned between the cup and another cup secured to the shock-absorber body, itself secured to the vehicle wheel; this lower portion of the spring ensures the suspension of the vehicle while receiving the pressure of the wheel and bearing on the cup held in place by the pressure exerted by the compression of the other upper portion of the spring; this latter compression being greater than that of the lower portion of the spring when the vehicle is naturally on its wheels, characterized by the fact that elastic means is disposed between the abutment of the cup, and the cup, so as to render progressive the elimination of one of the two springs mounted in series when said cup comes into abutment and that a second abutment will limit the path of the cup when this latter leaves its first abutment, the distance between the two abutments determines the precise path of the cup, from which derives, during the course of suspension, a "comfort zone" in which the stiffness is lower than during the remaining path, both in shock and in expansion and in which the first point of inflection of the curve is located at a value quite close to the load equivalent to the static position of the vehicle.

The "zone of comfort" is adjustable by adjusting the distance between the two abutments.

The second abutment of the cup is mounted securely to a movable jacket of an annular jack, to the body of the shock absorber of the suspension, the supply of fluid to the jack being from a channel having connecting threading below the lower cup of the spring, the movable jacket being returned by the return spring bearing on the first abutment, a hydraulic control actuating the annular jack and thus adjusting the position between the two abutments.

The hydraulic control, which acts on the annular jack on which is mounted the second abutment, is controlled by a computer which receives information from different sensors of pressure, orientation, moving loads, pressure in the brakes, steering, etc. . .

BRIEF DESCRIPTION OF THE DRAWINGS

The accompanying drawings are given by way of non-limiting example. They show a preferred embodiment according to the invention. They permit easy comprehension of the invention.

DETAILED DESCRIPTION OF THE INVENTION

For clarity, the reference numerals which indicate the same elements having the same function are designated throughout the text with the same reference numerals, for example: the two elastic elements, the cup, the abutments or bearing points.

Figure 2:
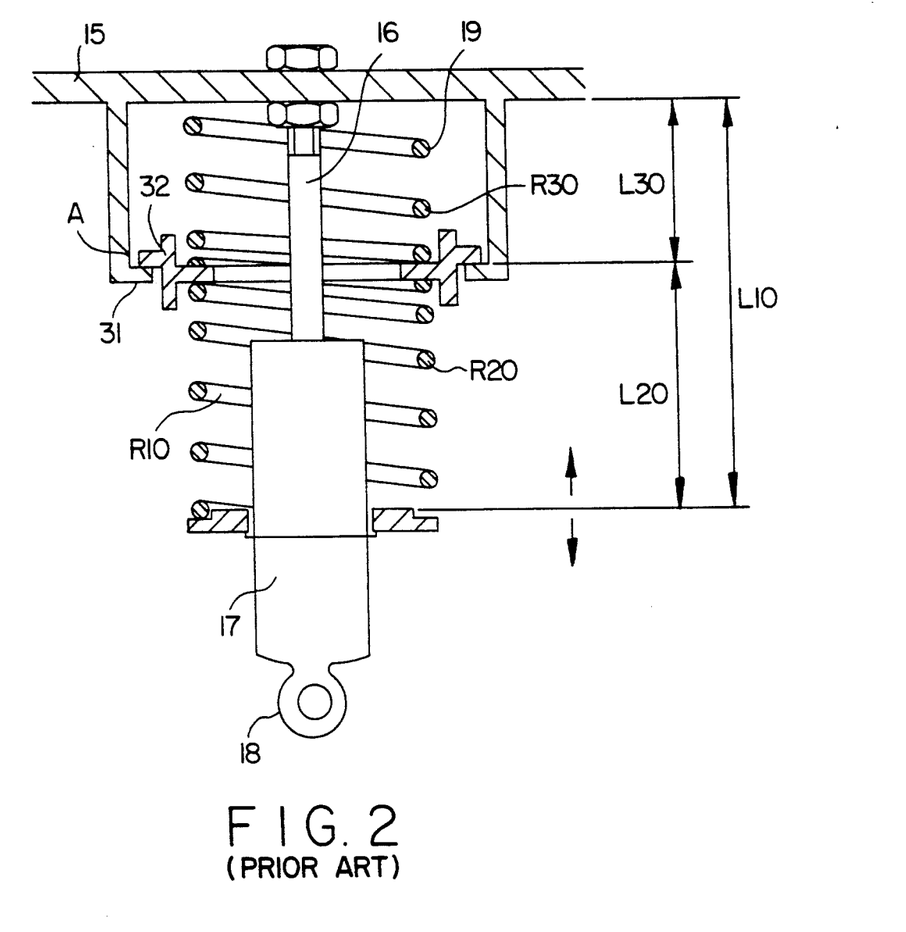
FIG. 2 is a schematic view of the suspension according to FIG. 1, but in which two elastic elements mounted in series are used. The abutment cup is disposed between the two elastic elements.

According to a first embodiment, the suspension uses two springs R20 and R30. The cup 32 is disposed between the two springs (see FIG. 2).

Figure 3:
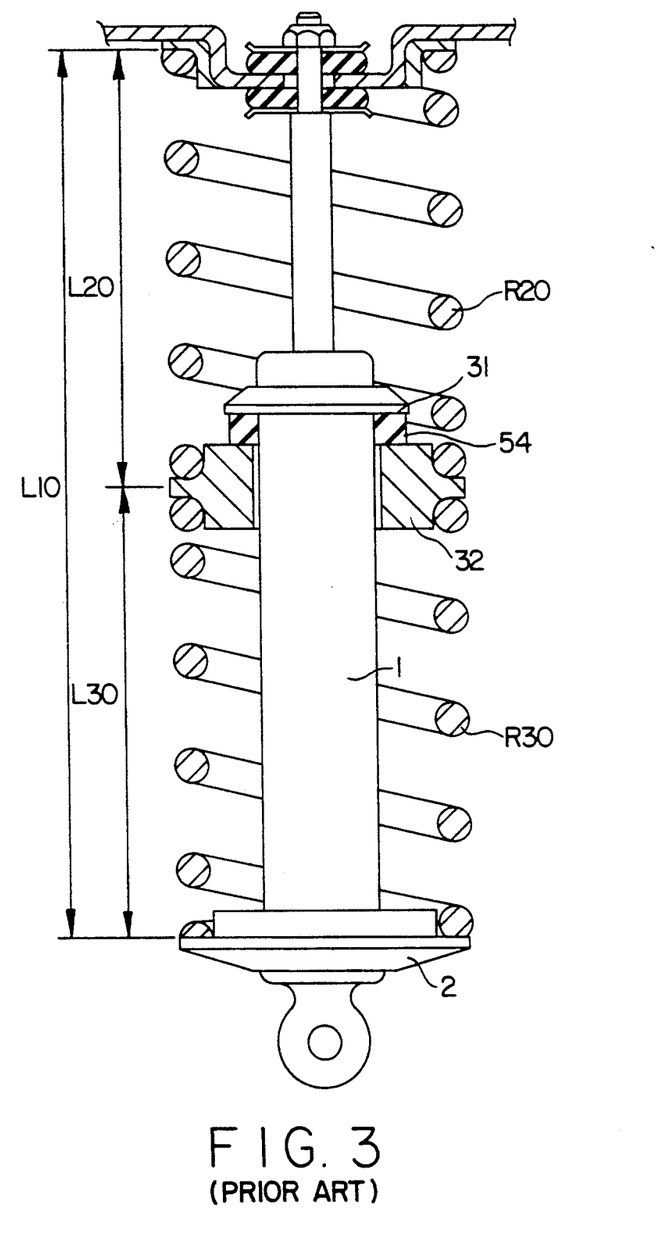
FIG. 3 is a schematic view of a suspension according to FIG. 2, but in which the abutment cup is mounted annularly on the body of the shock absorber.

According to another embodiment, the suspension uses a cup 32 which slides on the body 1 of the shock absorber element 2 of the suspension, this element bearing the abutment 31 which limits the expansion of spring R30 (see FIG. 3). In this embodiment, it will be seen that the spring R30 has passed from the upper condition to the lower condition, relative to the assembly of the two springs in series R30, R20.

Figure 4:
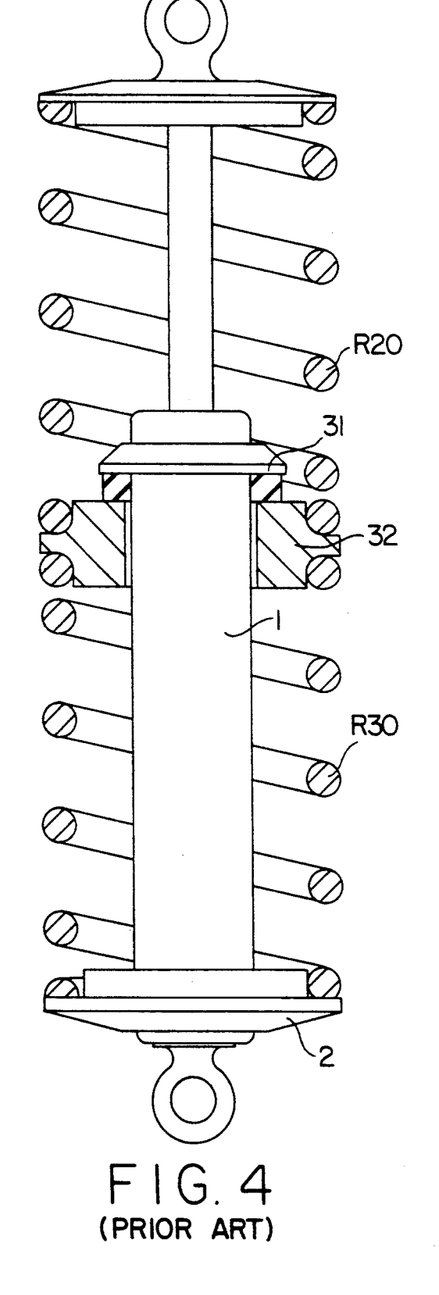
FIGS. 4 and 5 are views of two suspensions in which the assembly of the two springs is maintained between two cups both of which are borne by the shock absorber element.
Figure 5:
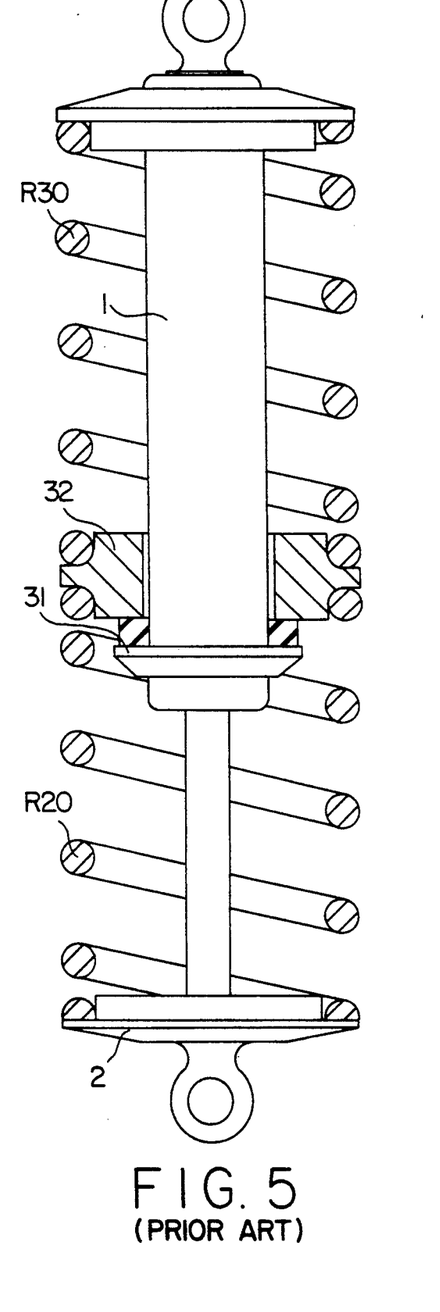

In another embodiment, the assembly of the two springs R30, R20 is maintained between two cups both borne by the shock absorber element (see FIGS. 4 and 5). This shock absorber assembly 2 plus springs R30, R20, is then mounted as desired with the body 1 of the shock absorber 2 secured to the wheel or the chassis, as shown in FIGS. 4 and 5.

Although this mounting of two springs R30, R20 in series is more simple to perform industrially, a difficulty remains as to the presence of the sliding guide of the cup 32, requiring a lubrication to protect against material thrown by the neighboring vehicle wheel.

Figure 6:
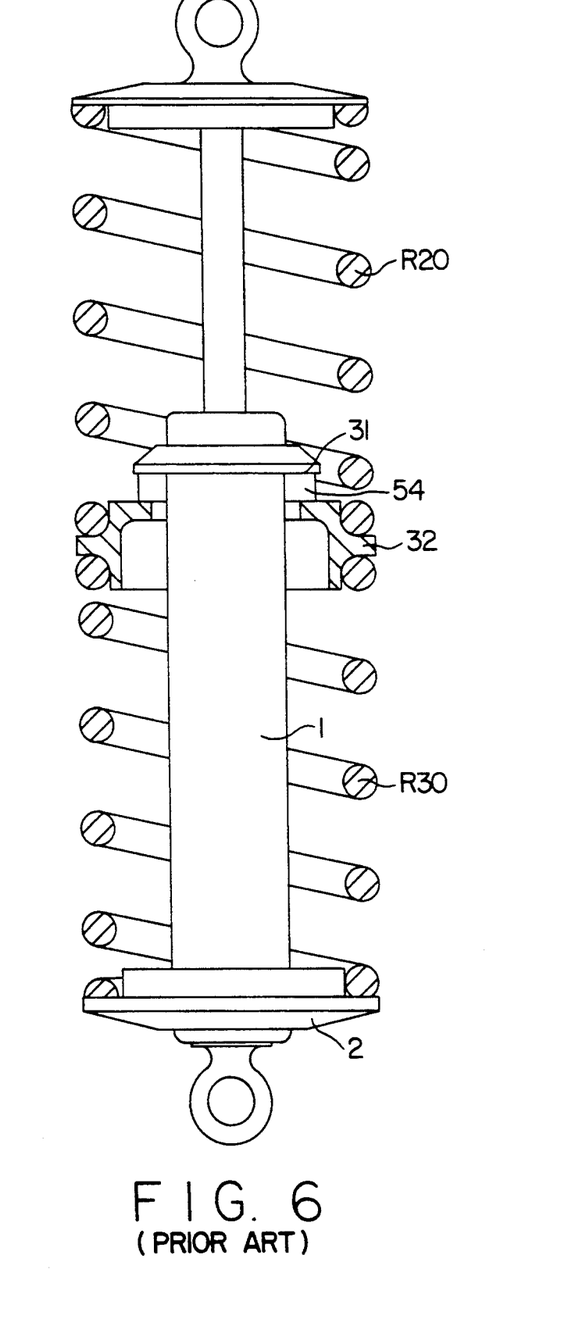
FIG. 6 is a schematic view of the suspension according to FIG. 5, but in which the abutment cup is mounted annularly with a certain play, so as to be maintained along the longitudinal axis of the shock absorber by the springs themselves.

According to another embodiment, there is provided the elimination of the guidance of the cup which, by the same token, can be more simply made (see FIG. 6). The cup 32 is annularly mounted on the body of the shock absorber with a certain play, so as to be maintained along the longitudinal axis of shock absorber 2 by the springs themselves.

The suspension according to the invention produces a comfort level which is higher the more the transition from one stiffness to the other takes place progressively (see the patents cited in the state of the art).

An elastic means such as an elastomeric block 54 is therefore installed for this purpose between the abutment 31 and the cup 32 so as to render progressive the elimination of the pressure of the spring R30 when the cup 32 comes into abutment against 31. This elastomeric block 54 is shown in several figures.

Figure 7:
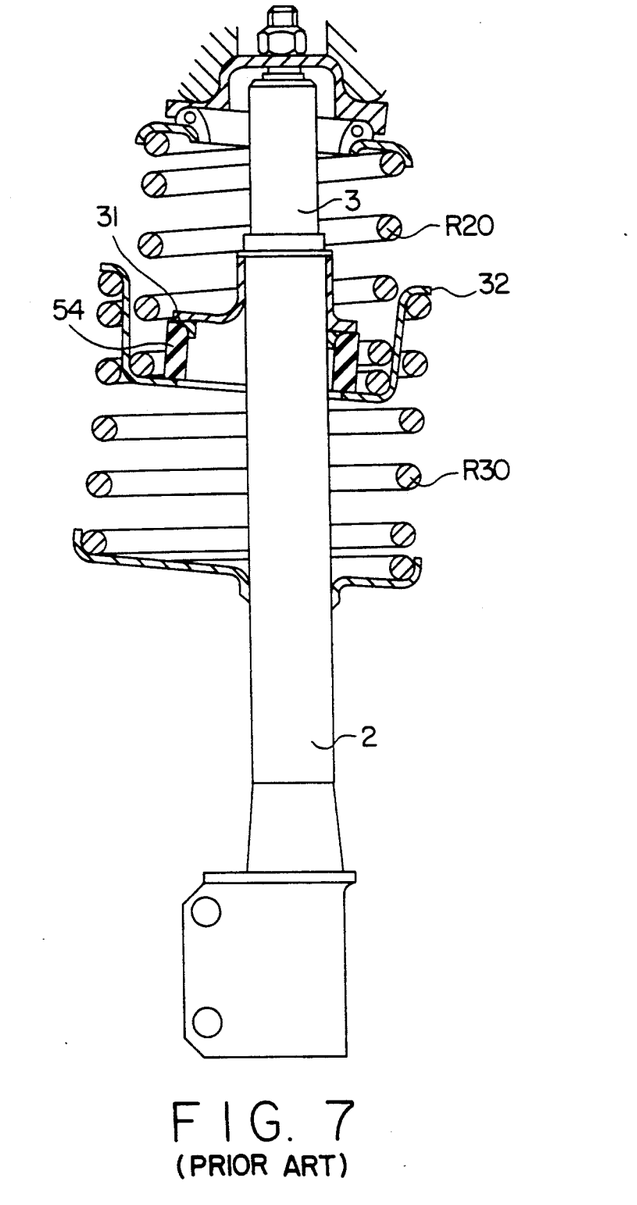
FIG. 7 is a schematic view of the suspension according to FIG. 6, but in which the abutment cup is provided for two springs mounted in series, namely partially concentric, so as to be able to be positioned on the element of a forward half-train of the MAC PHERSON type.

In the case in which the volume available to the two springs R20 and R30 is more favorable to springs of large diameter, than to great length, the cup 32 is so constituted that the two springs R30, R20 will be partially concentric, as shown in the element of a forward half-train of the Mac-Pherson type (see FIG. 7). Because of the inclination of the springs R30, R20 relative to the element of a forward half-train (inclination adapted to limit the radial forces on the sliding rod 3 of the leg), there will be seen a slight oblique movement of the springs R30, R20 relative to their axis during unloading. The absence of guidance by sliding is therefore very advantageous in this mounting in which the diameters of the springs R30, R20 are sufficiently large that sizable play ensures oblique displacement of the springs with no risk of parasitic interference.

Stiffness Increased at the End of the Shock Movement

The maintenance of the position of the vehicle can be still further improved by a reduction, at the end of the compression, of the increased stiffness utilized during expansion. This improvement is obtained by adding to the suspension element a second abutment 33 which limits the path of the cup 32 when it leaves its abutment 31 and moves away therefrom (see FIG. 8). The action is then located in the course of compression and the two springs R30, R20 work together in series, offering at this moment the sum of their flexibilities until the time at which the cup 32 comes into bearing with the abutment 33. The compression of the spring R30 is then interrupted, leaving the spring R20 the sole support of the load increase. The compression of the suspension thus terminates in a region of low flexibility identical to that observed during expansion of the suspension beyond the median position.

Figure 8:
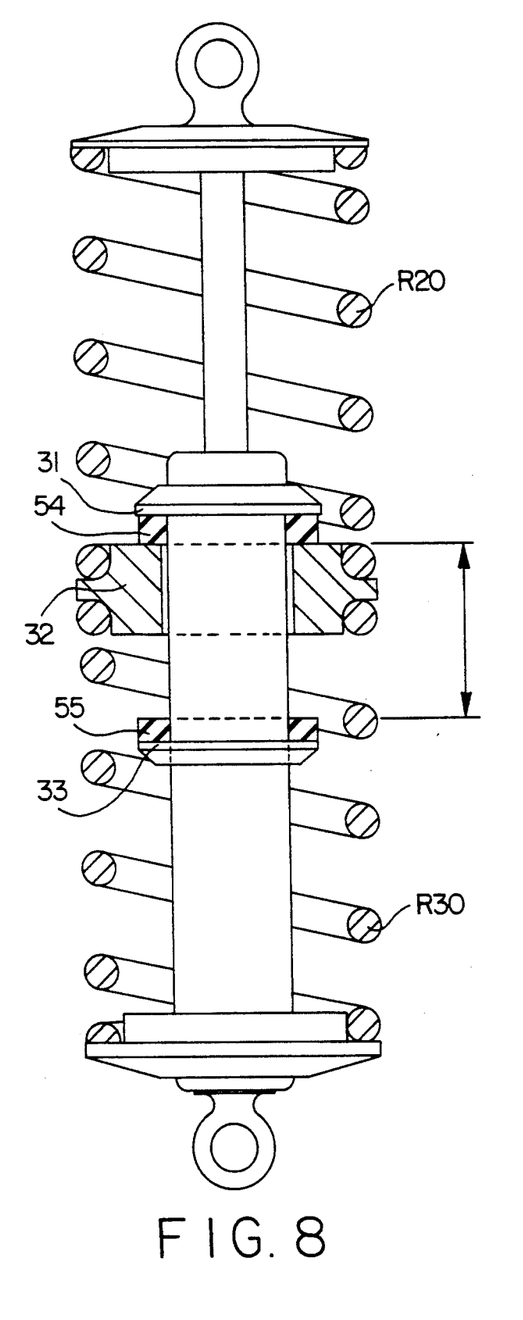
FIG. 8 is a schematic view of the suspension in which a second abutment or bearing point limits the path of the cup when this latter leaves its first abutment.

The use of a second abutment or second bearing point 33 permits using a second elastomeric block 55 which has the same function as block 54.

A vehicle thus equipped, subjected to strong lateral acceleration engendered by taking a curve rapidly, therefore benefits, during its inclination in operation, from an increase in the stiffness of its suspension, both inside and outside the curve. The distance between the two abutments 31 and 33 determines a precise path of the cup 32, from which there follows along the path of suspension a comfort zone in which the stiffness is lower than the rest of the path, both in shock and in expansion.

It has been pointed out, in the patents cited as the state of the art, that the change of radius in the course of expansion should be precisely located relative to the position of the suspensions when the vehicle is operating on its wheels.

This condition is ideally obtained when the vehicle is provided with a tilt correction device. Under these circumstances, the abutment 31 requires no adjustment of its position other than that initially effected during the provision of the vehicle.

On the other hand, the position of the second abutment 33 or second bearing point determines a behavior of the vehicle which must be the object of a compromise between comfort and tilt of the vehicle. It will therefore be well understood why it is of interest to endow the positioning of the second abutment 33 with a height adjustment that can be effected at any time.

Figure 9:
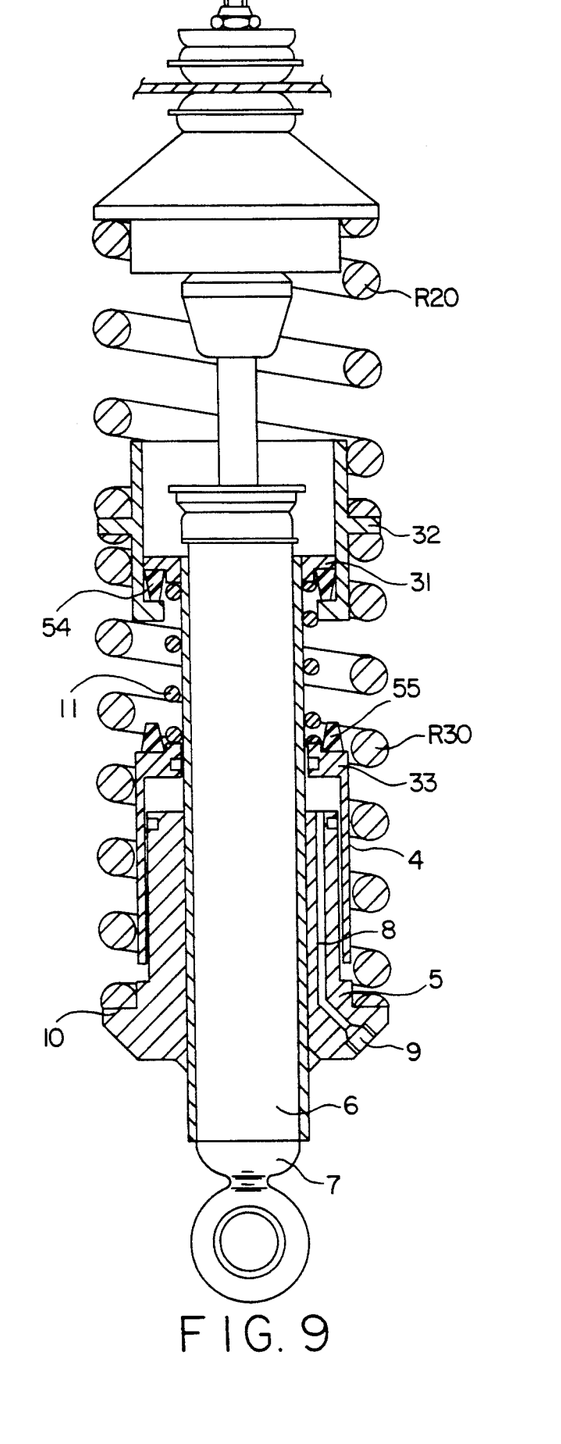
FIG. 9 is a schematic view of the suspension according to FIG. 8, in which a second abutment at the bearing point is mounted fixedly with a movable jacket of an annular jack to the body of the shock absorber of the suspension.

Suspension Element with Adjustable "Zone of Comfort" (see FIG. 9)

For ease of description of the suspension process, a mechanical guidance has been provided for the suspension described in FIG. 9, but as previously indicated, it is attempted to avoid this sliding in an industrial embodiment.

The second abutment 33 is disposed on the movable jacket 4 of an annular jack 5 on the body 6 of the suspension shock absorber 7. The supply of the jack 5 is from a conduit 8 having a connecting thread 9 under the lower retaining cup 10 of the spring R30. This movable jacket 4 is urged downwardly by a return spring 11 bearing on the first abutment 31. The stiffness of this return spring 11 is clearly identified, for given pressures within the jack 5 corresponding to precise heights of the second abutment 33. In other words, the control of the second abutment 33 is effected by control of the oil pressure sent to jack 5 when the cup 32 is not bearing against second abutment 33. When this second abutment 33 has thus been positioned, it suffices to fix the volume of oil in the jack 5, by closing an electrovalve (not shown) in the supply circuit to the jack 5. The driver of the vehicle can then, when the vehicle is not subjected to acceleration, impart a more or less sportive character to this latter by varying the height of the abutments 33 through an extremely simple hydraulic control.

"Piloted Abutment" Suspension Element

The same embodiment can be used in combination with an electronically controlled hydraulic circuit which then operates not by pressure variation but by volume variation. A computer (not shown in the drawings) thus receives information from the various detectors of acceleration, movement or pressure (longitudinal accelerations or decelerations, lateral accelerations, brake pressure, accelerating movement, change of direction, etc. . . ).

The computer derives instructions from this and transmits them to a hydraulic center which thus controls the displacement of the second abutment or bearing point of the cup 32 of each suspension element, accordingly as an increase in stiffness is desired to counter swaying or pitching movement engendered by starting a turn, braking or action on the accelerator.

ESSENTIAL DIFFERENCES BETWEEN CONTRACTIVE SUSPENSIONS AND A. DUBONNET SUSPENSIONS

Figure 10:
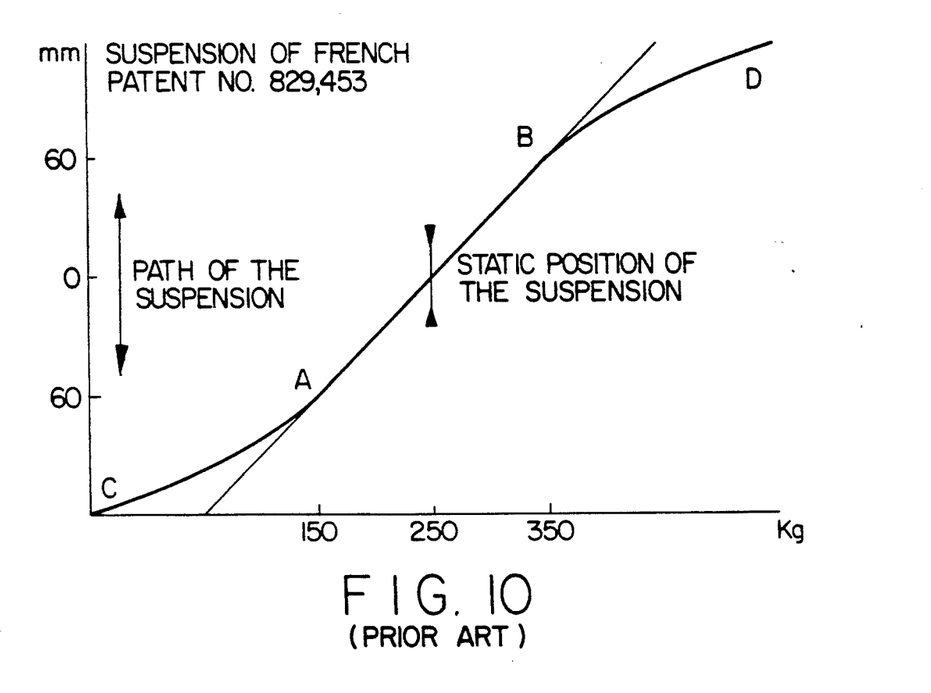
FIG. 10 shows the curve obtained with the suspension of DUBONNET FR-A-829.453 and in which the simulation is quantified.
Figure 11:
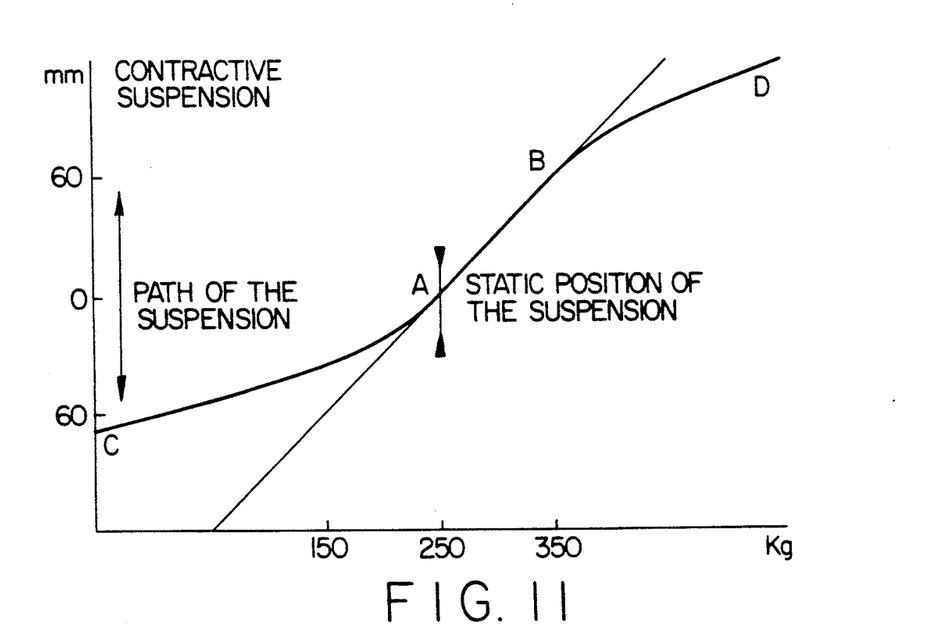
FIG. 11 shows the curve obtained with the suspension according to the invention, and in which the simulation is quantified. It illustrates the first point of deflection which is located in the static position of the suspension, contrary to the DUBONNET patent.

To show the essential differences between the suspension of DUBONNET FR-A-829.453 and the suspension according to the invention, it is necessary to make a dimensioned simulation of the characteristics of the two suspensions; to this end, reference is had to FIGS. 10 and 11.

Thus, it will be supposed that the static load on the vehicle is 250 kg, that the lowest flexibility will be 20%, while the greatest flexibility will be 60% and that for this example the effect of anti-sway bars will be ignored.

A. Dubonnet Suspension

Thus, according to the technique described by this concept, it is possible to suppose that the pre-stressed spring has already been given 150 kg of pre-stress. Thus there is a first break point of flexibilities A at 150 kg, while the break point B is at 350 kg.

Contractive Suspension

The essential technical characteristic of the suspension according to the invention is to fix the break point A at a value very close to the equivalent load when the vehicle is stationary (according to the desired characteristics, a sporty, normal or high comfort arrangement, the pre-stress of the spring will be determined by the supplier: sometimes exactly at the value equivalent to the static load, sometimes with pre-stress a bit increased to enjoy a sporty mode, sometimes with slightly decreased pre-stress to promote comfort).

In this way, in this example, the spring pre-stress will be adjusted to 250 kg, there thus exists a first change in the flexibility curve A at 250 kg, while the flex point B is at 350 kg.

Conventional Suspension

The reference vehicle provided with conventional suspensions has a flexibility of 50%, but linear along all the path of the suspension.

Result as to Maintenance of Attitude and as to Stability of the Vehicle

At the time at which the automobile provided with the A. DUBONNET suspension has been subjected to a lateral or longitudinal acceleration which causes the suspensions to have flex points A and B, it is possible to measure a deflection of the abutment suspension of 60 mm, while the suspension which is unloaded has been subjected to an unloading of 60 mm.

In total, the pitching or rolling thus reaches 60+60=120 mm.

Subjected to the same acceleration, the automobile which is provided with a suspension according to the invention, will receive an abutment suspension deflection of 60 mm while the unloading of the suspension will be limited to 20 mm for a rolling or pitching total of 80 m/m of one suspension relative to the other.

The process according to the invention creates a sort of "reference level" which stabilizes the vehicle during slight rolling or pitching, the most spectacular manifestation being the almost total suppression of swerving which takes place (the vehicle on one side of the road swerves sharply to the opposite side with a momentum that is frequently impossible to control); finally, the alternation of the two frequencies imparts an auto-shock absorption.

The reference vehicle, subjected to the same acceleration and provided with conventional suspensions, receives a deflection of the bearing suspension of 50 mm while the unloaded suspension is subjected to a load decrease of 50 mm namely a pitching or rolling of 50+50=100 mm.

In short:
the suspension according to the invention provides:
    improved vertical absorption (60% of flexibility)
    reduced rolling or pitching (80 mm)
    better stability (by creation of a reference level)
    auto-shock absorbing (by alternation of the two frequencies)

A. DUBONNET:
    improved vertical absorption (60% of flexibility)
    increased rolling or pitching (120 mm)
    loss of stability
    auto-shock absorbing (by alternation between the two frequencies, but only upon substantial load relief)
CONVENTIONAL SUSPENSION:
    less vertical absorption (50% of flexibility)
    moderate rolling and pitching (100 mm)
    moderate stability
    no auto-shock absorption (absence of two frequencies)

This comparison, of the DUBONNET suspension and the MAURO BIANCHI suspension, shows the new and surprising result of the suspension process according to the invention.

REFERENCES

1. Body of the shock absorber
2. Shock absorber
3. Sliding rod
4. Movable jacket
5. Annular jack
6. Body of the shock absorber
7. Suspension shock absorber
8. Channel
9. Connecting thread
10. Lower positioning cup for the spring R30
11. Return spring
15. Chassis
16. Shock absorber rod
17. Shock absorber body
18. End of shock absorber
19. Chamber
R10. Spring
R20. Portion of spring R10
R30. Portion of spring R10
L10. Length of spring R10
L20. Length of spring R20
L30. Length of spring R30
31. Bearing or abutment
32. Cup
33. Second bearing or abutment
54. Elastomeric block
55. Elastomeric block

What is claimed is:

1. A suspension for a vehicle wheel, comprising an elongated shock absorber (7) having an elongated body (6) and first and second abutments at opposite ends of the shock absorber, first and second coil compression springs (R20, R30) aligned with each other and surrounding the shock absorber (7), one of said springs bearing against one of said abutments and the other of said springs bearing against the other of said abutments, a cup (32) between said springs, said cup surrounding said body and being movable lengthwise of said body, both of said springs bearing on said cup (32), an annular jack (5) fixed to and surrounding said body and comprising one (10) of said abutments, a third abutment (31) fixed to said body a distance from said jack (5), elastic means (54) compressible between said cup (32) and said third abutment (31), a movable jacket (4) surrounding and slidable in sealed relationship on said body (6) and said annular jack (5) and defining with said body (6) and jack (5) a hydraulic chamber of variable size, means (8, 9) to deliver hydraulic fluid to said hydraulic chamber to vary the size of said hydraulic chamber, and a third coil compression spring (11) surrounding said body (6) and acting between said third abutment (31) and said jacket (4).

2. A suspension as claimed in claim 1, wherein said means to deliver hydraulic fluid to said hydraulic chamber comprises a channel (8) having a connecting thread (9) disposed under said one abutment (10).

3. A suspension as claimed in claim 1, and further elastic means (55) elastically compressible between said cup (32) and said jacket (4).

* * * * *